（12） United States Patent
Muceus

(10) Patent No.: US 12,247,800 B2
(45) Date of Patent: Mar. 11, 2025

(54) HEAT PROTECTIVE SLEEVE

(71) Applicant: Battle Born Supply Co., Paradise Valley, NV (US)

(72) Inventor: Ian Muceus, Paradise Valley, NV (US)

(73) Assignee: Battle Born Supply Co., Paradise Valley, NV (US)

( * ) Notice: Subject to any disclaimer, the term of this patent is extended or adjusted under 35 U.S.C. 154(b) by 150 days.

(21) Appl. No.: 18/064,394

(22) Filed: Dec. 12, 2022

(65) Prior Publication Data

US 2023/0194201 A1 Jun. 22, 2023

Related U.S. Application Data

(60) Provisional application No. 63/265,614, filed on Dec. 17, 2021.

(51) Int. Cl.
*F41A 21/44* (2006.01)
*F16L 59/02* (2006.01)

(52) U.S. Cl.
CPC ............ *F41A 21/44* (2013.01); *F16L 59/021* (2013.01); *F16L 59/028* (2013.01)

(58) Field of Classification Search
CPC ...... F41A 21/44; F41A 59/021; F41A 59/028; F41A 159/021; F41A 159/028
USPC ........................................................ 428/920
See application file for complete search history.

(56) References Cited

U.S. PATENT DOCUMENTS

| 1,003,531 A | 9/1911 | Smoot et al. |
| 1,127,250 A | 2/1915 | Humm |
| 1,939,700 A | 12/1933 | Hofstetter |
| 2,043,731 A | 6/1936 | Bourne |
| 2,448,382 A | 8/1948 | Mason |
| 3,667,570 A | 6/1972 | Werbel, III |
| 3,786,895 A | 1/1974 | Perrine |

(Continued)

FOREIGN PATENT DOCUMENTS

| CA | 2923024 A1 | 9/2016 |
| EP | 0166802 A1 | 1/1986 |

(Continued)

OTHER PUBLICATIONS

Beecroft M. 3D printing of weft knitted textile based structures by selective laser sintering of nylon powder. IOP Conference Series: Materials Science and Engineering, Jul. 1, 2016, vol. 137, pp. 1-7 introduction; and figures 10-12.

(Continued)

*Primary Examiner* — Tri V Nguyen
(74) *Attorney, Agent, or Firm* — MLO, a professional corp.

(57) ABSTRACT

A heat protective sleeve includes a body being cylindrical extending along a longitudinal direction and comprising a triply periodic minimal surfaces (TPMS) structure, an open cell foam structure, or a lattice structure. A strip extends along the longitudinal direction of the body. The strip is a same material as the TPMS structure, the open cell foam structure, or the lattice structure. The material of the strip is solid and without holes through it. An endcap removably couples to the body. In some examples, the body has fastening threads and the endcap has mating threads. The mating threads of the endcap are configured to engage with the fastening threads of the body to releasably couple the endcap to the body.

20 Claims, 9 Drawing Sheets

(56) References Cited

U.S. PATENT DOCUMENTS

| | | | |
|---|---|---|---|
| 4,576,083 A | 3/1986 | Seberger, Jr. | |
| 4,638,713 A | 1/1987 | Milne et al. | |
| 5,136,923 A | 8/1992 | Walsh, Jr. | |
| 6,308,609 B1 | 10/2001 | Davies | |
| 7,412,917 B2 | 8/2008 | Vais | |
| 7,600,606 B2 | 10/2009 | Brittingham | |
| 7,874,238 B2 | 1/2011 | Silvers | |
| 8,087,338 B1 | 1/2012 | Hines | |
| 8,286,750 B1 | 10/2012 | Oliver | |
| 8,875,612 B1 | 11/2014 | Klett et al. | |
| 9,194,640 B2 | 11/2015 | Wirth et al. | |
| 9,482,484 B2 | 11/2016 | Barney | |
| 9,506,710 B2 | 11/2016 | Smith | |
| 9,593,899 B2 | 3/2017 | Coppinger et al. | |
| 9,702,651 B2 | 7/2017 | Petersen | |
| 9,746,267 B2 | 8/2017 | Smith | |
| 9,851,166 B2 | 12/2017 | Petersen | |
| D860,369 S | 9/2019 | Sakash et al. | |
| 10,487,961 B2 | 11/2019 | Eilers et al. | |
| 10,488,137 B1 | 11/2019 | Dean | |
| 10,596,660 B2 | 3/2020 | McCarthy et al. | |
| 10,809,032 B1* | 10/2020 | Thomas | F41A 21/44 |
| 11,248,870 B1 | 2/2022 | Nagy-Zambo et al. | |
| 2003/0145718 A1 | 8/2003 | Hausken et al. | |
| 2012/0167435 A1 | 7/2012 | Poling | |
| 2013/0015652 A1 | 1/2013 | Thomas et al. | |
| 2013/0299035 A1 | 11/2013 | Laurent et al. | |
| 2015/0241159 A1 | 8/2015 | Michal et al. | |
| 2015/0285575 A1 | 10/2015 | Sclafani | |
| 2015/0354422 A1 | 12/2015 | Liskey et al. | |
| 2016/0076845 A1 | 3/2016 | Almazan et al. | |
| 2017/0003094 A1 | 1/2017 | Person | |
| 2017/0008039 A1 | 1/2017 | Weinberger et al. | |
| 2017/0299316 A1 | 10/2017 | Vossler | |
| 2017/0328666 A1 | 11/2017 | Liskey et al. | |
| 2018/0117872 A1 | 5/2018 | Al-Rub et al. | |
| 2018/0148364 A1 | 5/2018 | Klein et al. | |
| 2018/0224235 A1 | 8/2018 | Couvillion | |
| 2018/0271572 A1 | 9/2018 | Whyne et al. | |
| 2018/0292160 A1 | 10/2018 | Petersen | |
| 2018/0372438 A1 | 12/2018 | Washburn, III et al. | |
| 2019/0128632 A1 | 5/2019 | Christandl et al. | |
| 2019/0242667 A1 | 8/2019 | Lo | |
| 2019/0274925 A1 | 9/2019 | Vlahinos et al. | |
| 2020/0025491 A1 | 1/2020 | Petersen | |
| 2020/0025493 A1 | 1/2020 | Campbell et al. | |
| 2020/0248980 A1 | 8/2020 | Bragais | |
| 2020/0263947 A1 | 8/2020 | Calderwood et al. | |
| 2020/0292268 A1 | 9/2020 | Lo | |
| 2021/0190450 A1 | 6/2021 | Buchel | |
| 2021/0333061 A1* | 10/2021 | Muceus | B22F 5/106 |
| 2022/0082345 A1* | 3/2022 | Nagy-Zambo | F41A 21/34 |

FOREIGN PATENT DOCUMENTS

| | | |
|---|---|---|
| WO | 2011035111 A1 | 3/2011 |
| WO | 2014087401 A1 | 6/2014 |
| WO | 2017082439 A1 | 5/2017 |

OTHER PUBLICATIONS

International Search Report and Written Opinion dated Jan. 13, 2022 for PCT Patent Application No. PCT/IB2021/059422.

International Search Report and Written Opinion dated Jul. 1, 2021 for PCT Patent Application No. PCT/IB2021/052593.

Notice of Allowance and Fees dated Aug. 31, 2022 for U.S. Appl. No. 17/450,751.

Notice of Allowance and Fees dated Mar. 16, 2022 for U.S. Appl. No. 16/855,387.

Suppressor Cover, Armageddon Gear, Accessed Online On Jan. 7, 2021, 4 pages, https://www.armageddongear.com/Suppressor-Cover.

Yang et al. Acoustic absorptions of multifunctional polymeric cellular structures based on triply periodic minimal surfaces fabricated by stereolithography. Virtual and Physical Prototyping, Mar. 19, 2020, vol. 15, No. 2, pp. 1-8 [online], [retrieved on Jun. 14, 2021]. Retrieved from.

* cited by examiner

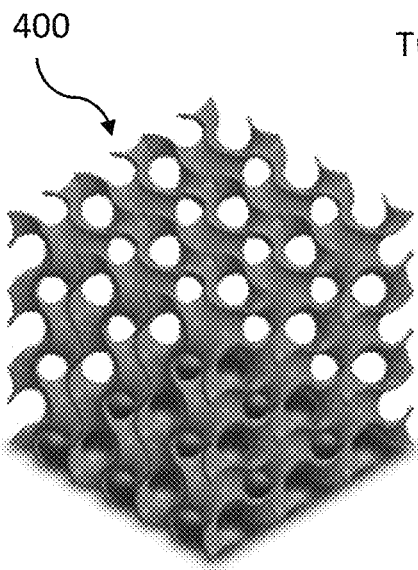
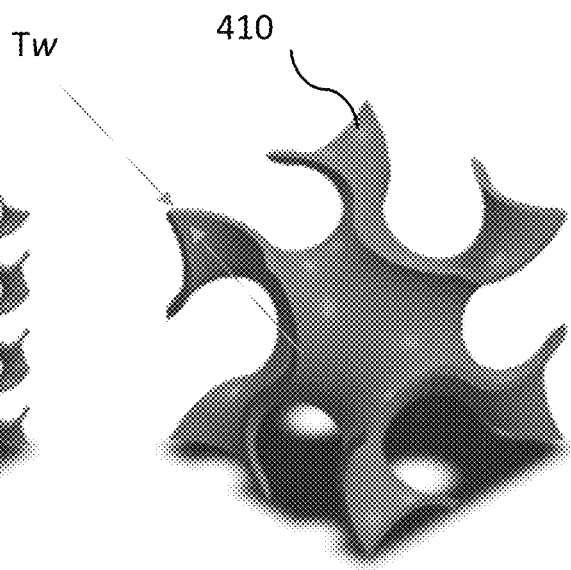
FIG. 4A  FIG. 4B
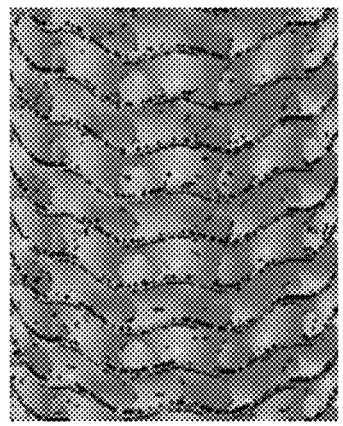
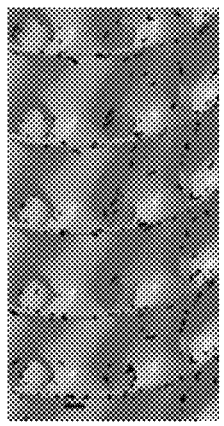
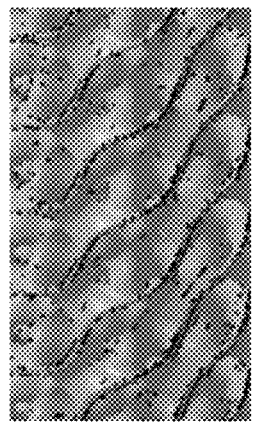
FIG. 5A  FIG. 5B  FIG. 5C

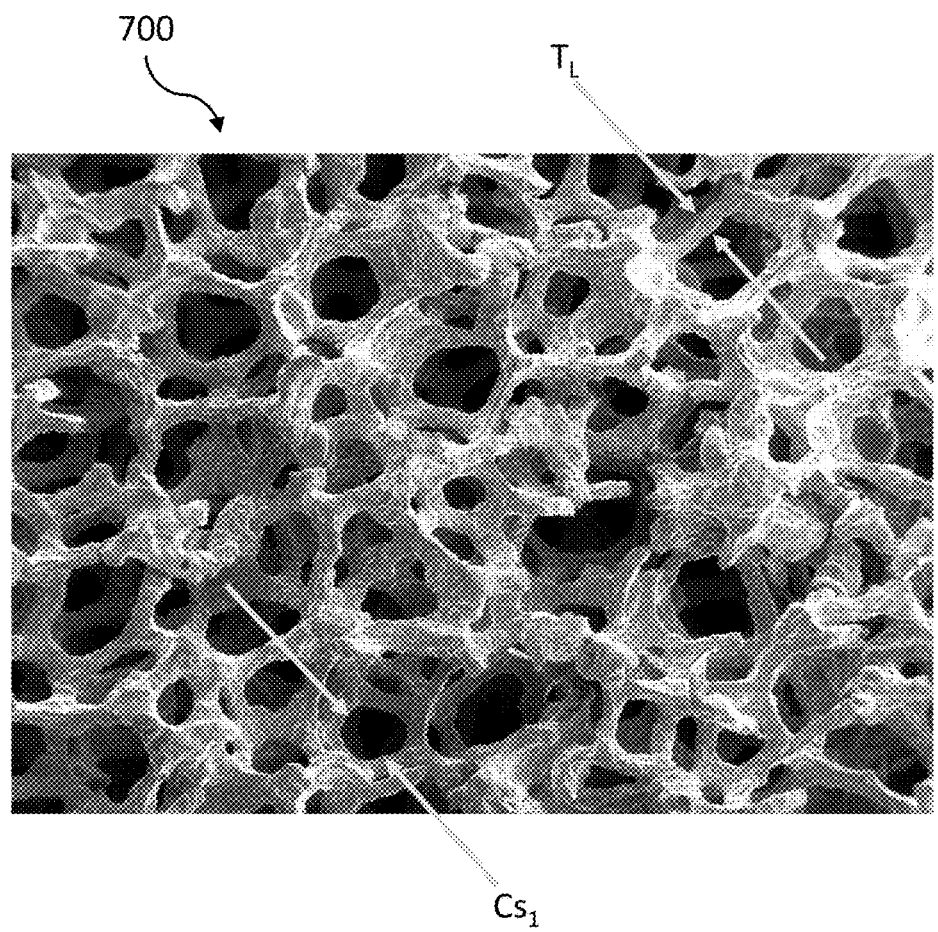
FIG. 7
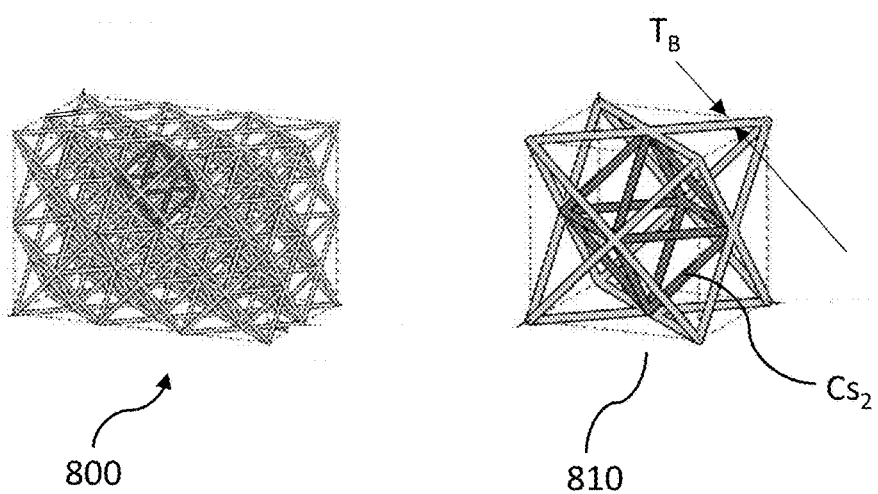
FIG. 8A  FIG. 8B

Section B-B

HEAT PROTECTIVE SLEEVE

RELATED APPLICATIONS

This application claims priority to U.S. Provisional Application No. 63/265,614, filed on Dec. 17, 2021, and entitled "Heat Protective Sleeve", which is hereby incorporated by reference in full.

BACKGROUND

Firearms generate a high amount of heat when projectiles are discharged. Firearms include a barrel, which is a tube through which the projectile travels, and may also include a sound suppressor attached to the firing end of the barrel (i.e., the muzzle). Sound suppressors, which are also known as silencers, increase the volume available for propellant gases to disperse, above the volume that is provided by the cartridge and barrel of the firearm. Both the barrel and sound suppressor can become dangerous for a human to touch after use, reaching temperatures above 1000° Fahrenheit. Consequently, an operator must often wait several minutes before removing a suppressor or touching a firearm barrel. It is also common for users to be burned due to contact with a hot barrel and/or suppressor, while a firearm is slung around their body on a gun sling.

A miraging phenomenon or optical refraction phenomenon effect known as "heat haze" or "miraging" impacts weapon systems with attached optics. This is due to the radiant heat rising from the barrel of the firearm and any barrel attachment, such as suppressors, muzzle brakes, and flash hiders during operation. As the intense heat rises upward from the firearm or barrel attachment, the optics can produce distorted sight pictures, leading to the operator and firearm pairing to become less accurate.

SUMMARY

In some embodiments, a heat protective sleeve includes a body being cylindrical extending along a longitudinal direction, and comprising a triply periodic minimal surfaces (TPMS) structure. A strip extends along the longitudinal direction of the body. The strip is a same material as the TPMS structure, and the material of the strip is solid and without holes through it. An endcap removably couples to the body.

In some embodiments, a heat protective sleeve includes a body being cylindrical extending along a longitudinal direction. The body has a first end opposite a second end. The first end has fastening threads and the second end has a plurality of tabs. A strip extends along the longitudinal direction of the body. The strip is a same material as the TPMS structure. The material of the strip is solid and without holes through it. An endcap has mating threads configured to engage with the fastening threads of the body to releasably couple the endcap to the body. In some embodiments, the body comprises a triply periodic minimal surfaces (TPMS) structure, an open cell foam structure or a lattice structure.

BRIEF DESCRIPTION OF THE DRAWINGS

FIG. 4A is a schematic of a gyroid triply periodic minimal surface, in accordance with some embodiments.

FIG. 4B is a schematic of a gyroid unit cell of the gyroid triply periodic minimal surface, in accordance with some embodiments.

FIG. 5A shows a Schoen's Gyroid TPMS, as known in the art.

FIG. 5B shows a Schwarz CLP, as known in the art.

FIG. 5C shows a Schwarz Batwing, as known in the art.

FIG. 7 is a schematic of an open cell foam structure, in accordance with some embodiments.

FIG. 8A is a schematic of a lattice structure, in accordance with some embodiments.

FIG. 8B is a schematic of an octet-truss lattice unit cell of the lattice structure, in accordance with some embodiments.

DETAILED DESCRIPTION

Figure 1:
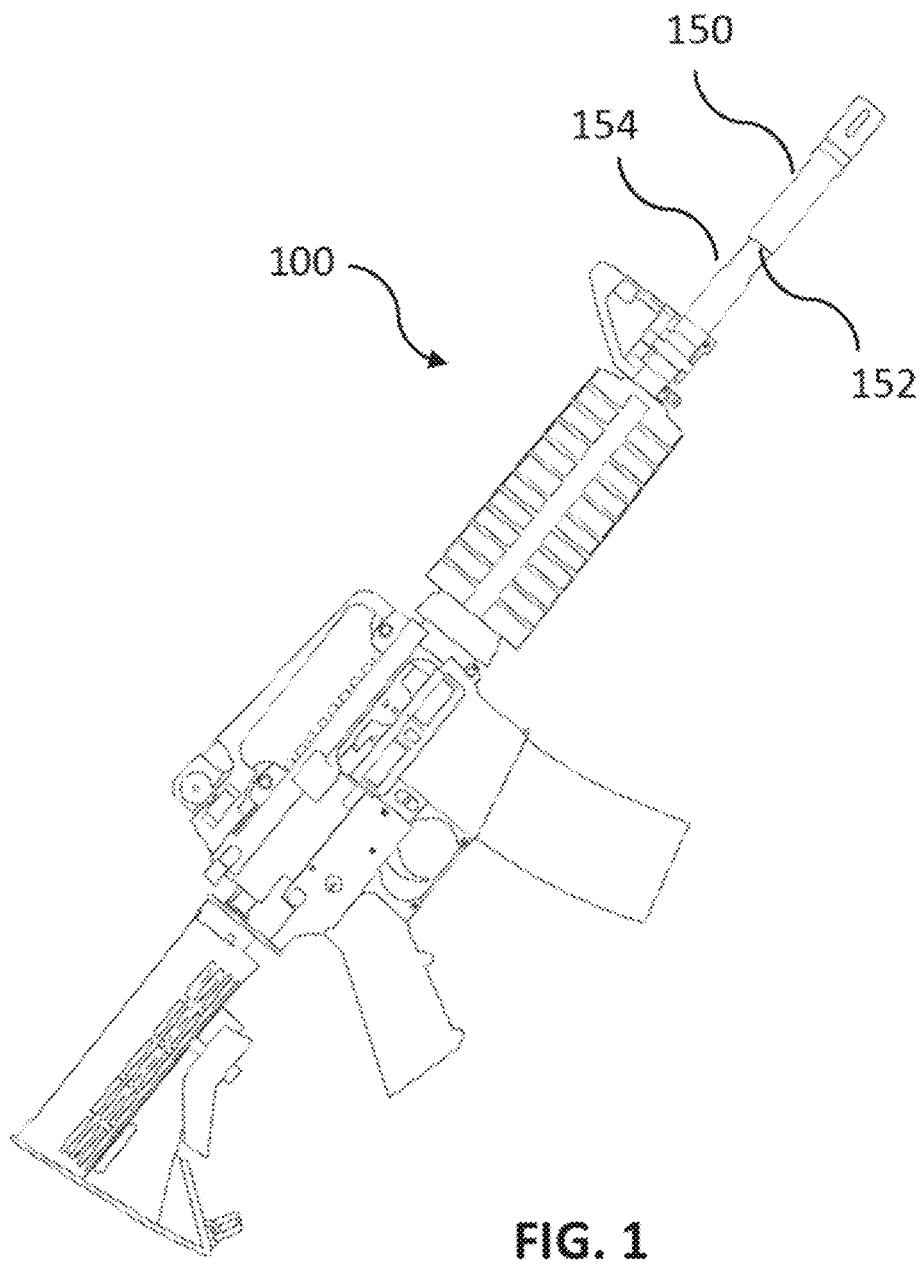
FIG. 1 is a perspective view of a firearm with a suppressor, as known in the art.

Conventional suppressor covers are fabric or textile sleeves that slide or are draped over a suppressor and are typically comprised of nylons, aramids, or other high-temperature textiles. These covers are affixed onto the suppressor with hook-and-loop fasteners, drawcords, or other features. These suppressor covers protect a user against contact with a heated suppressor and can also reduce a mirage effect caused by radiant heat that is emitted from the suppressor while shooting. However, textile or fabric wraps are typically a solid, continuous sheet that completely encapsulate the suppressor and fully insulate the suppressor, trapping the heat instead of allowing the heat to dissipate. Consequently, the suppressors can still pose a burn risk when the cover is removed. Also, suppressor cover manufacturers advise that the covers should be removed soon after the firearm has been used to prevent thermal damage that can be caused to the suppressor by the heat build-up, which may reduce the life of the product.

The present disclosure describes a heat protective sleeve comprising triply periodic minimal surfaces (TPMS) structures, open cell foam structures, or lattice structures. In this disclosure, these geometric structures are collectively referred to as "geometric structures". The geometric structures allow heat to vent and dissipate while insulating a user from the heated object being covered by the sleeve. A user can thus use their bare hands to touch a surface that they would otherwise be unable to handle for fear of serious injury. The sleeve provides enough surface area to protect the user and enables gripping interaction with the underlying object (e.g., suppressor or barrel). The heat protective sleeve is uniquely designed to allow ventilation to the underlying object, which also reduces the risk of internal damage to the object from thermal weathering effects. In contrast, conventional suppressor covers trap heat which results in lengthy times for the suppressor to be able to be handled directly, and can also cause damage to the suppressor due to the accumulated heat.

The geometric structures of the heat protective sleeve are made of high-temperature (e.g., thermal stability of at least 400° F.), high-strength, and low thermal conductivity materials such as ceramics or polymers. For example, when producing TPMS structures with thermally insulative materials, the heat protective sleeve has an overall volume comprised mostly of negative space. Negative space is open space lacking material. Put another way, the negative space is comprised largely of air, which is a very poor conductor of heat (~0.026 W/m·K). When this high percentage of negative space (e.g., air space) is combined with geometric structures created from materials with very low thermal conductivity (e.g., 0.01-5 W/m·K), a bounding box is created which is poor at transferring heat from a hot suppressor to a user's hand. By employing the geometric structures, there is minimal part surface area contacting the hot substrate object, so minimal thermal conduction occurs. Materials with very low thermal conductivity may be ceramics, high-temperature polymers, which may be non-filled or filled with particles such as ceramics or composites, or a polymer coated with a thin protective coating.

In some embodiments, the heat protective sleeve is additively manufactured such as by 3D printing. The geometric structures beneficially allow for large areas of negative (open) space where heat can be dissipated through convective cooling, from the underlying object out into the ambient air. The materials, such as polymers or ceramics, act as an insulator due to their low thermal conductivity. The heat protective sleeve, comprised of one of the geometric structures, allows the barrel or suppressor to cool after the discharging of the firearm, instead of fully wrapping it in a solid-surface textile insulator as in conventional suppressor covers. It is known in the art that suppressors are extremely hot such as greater than 1000° F. after discharging the firearm multiple times. The open geometric structure of the present heat protective sleeve enables natural heating and cooling cycles to occur which results in improved operational life for the firearm or suppressor.

The user is protected from the heated object and can interact more easily with the device. For example, with the heat protective sleeve installed over the suppressor, the user can remove an extremely hot suppressor from a barrel with their bare hands rather than waiting several minutes (e.g., ten minutes or more) for the suppressor to cool. For example, the heat protective sleeve can reduce the external surface of the suppressor to about 140° F., which is the temperature at which it's generally considered safe to touch an object for less than 5 seconds. With the heat protective sleeve installed on a suppressor, the user can grasp the heat protective sleeve and use it to contact and remove the heated suppressor without burning themselves. Also, the heat protective sleeve reduces the potential for the covered barrel or suppressor to accidentally burn or injure the user, such as when a firearm is slung around the user's body.

The heat protective sleeve is comprised of geometric structures, such as TPMSs, open cell foams, or lattices, which reduce the weight of the heat protective sleeve since the geometric structures have open spaces instead of a solid form. This enables the user to carry the heat protective sleeve more efficiently and easily, meaning the user will use the heat protective sleeve more often in the field, resulting in greater safety to the user and firearm.

The heat protective sleeve may include a strip along the surface of the body of the heat protective sleeve. The strip is a continuous material comprised of the same material as the body or another high-temperature material. During use, the strip is positioned on the top side of the barrel of the firearm or suppressor along the line of sight and below the sight picture and field of view of attached optical devices. The strip blocks or diminishes the optical refraction phenomenon known as heat haze or miraging when sighting a target. This solid (i.e., without holes through its thickness), axial top strip component of the heat protective sleeve design improves shooter and weapon accuracy and effectively eliminates heat haze. The inclusion of the strip still allows the underlying object such as the suppressor or weapon barrel to heat and cool more cyclically without insulating and trapping residual heat build-up.

In this disclosure, although embodiments will be described primarily in relation to firearm barrels and suppressors, the heat protective sleeve is applicable to other objects that become heated, such as exhaust pipes. Furthermore, the heat protective sleeve shall be shown primarily as circular tubes; however, the device need not necessarily be cylindrical but can have other cross-sectional shapes, such as oval or rectangular, and depends on the shape of the underlying object.

FIG. 1 is a perspective view of a firearm with a suppressor, as known in the art. For example, a conventional firearm 100 has a suppressor 150 attached to a muzzle 152, which is the firing end of the barrel 154 of firearm 100. The suppressor 150 is most commonly attached to a firearm by a mount 156 (shown in FIG. 2C). The mount 156 may be a threaded mount, non-threaded mount such as a quick-release mechanism, or adapter. For illustration purposes, the suppressor has a first suppressor end located at the muzzle end of the barrel 154 of firearm 100. A second suppressor end is opposite the first suppressor end and located further away from the muzzle end of the firearm 100.

Figure 2A:
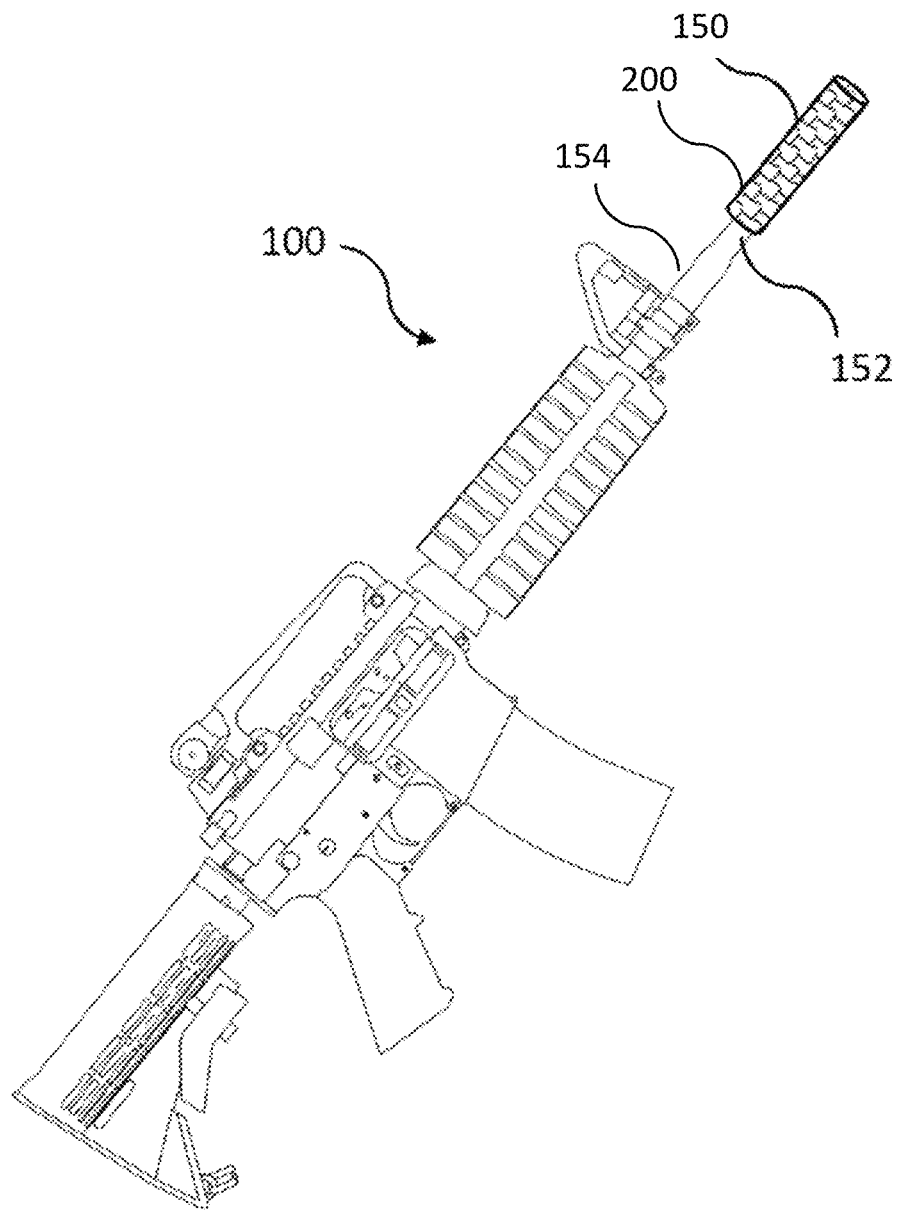
FIG. 2A is a perspective view of a heat protective sleeve installed on the suppressor of a firearm, in accordance with some embodiments.
Figure 2B:
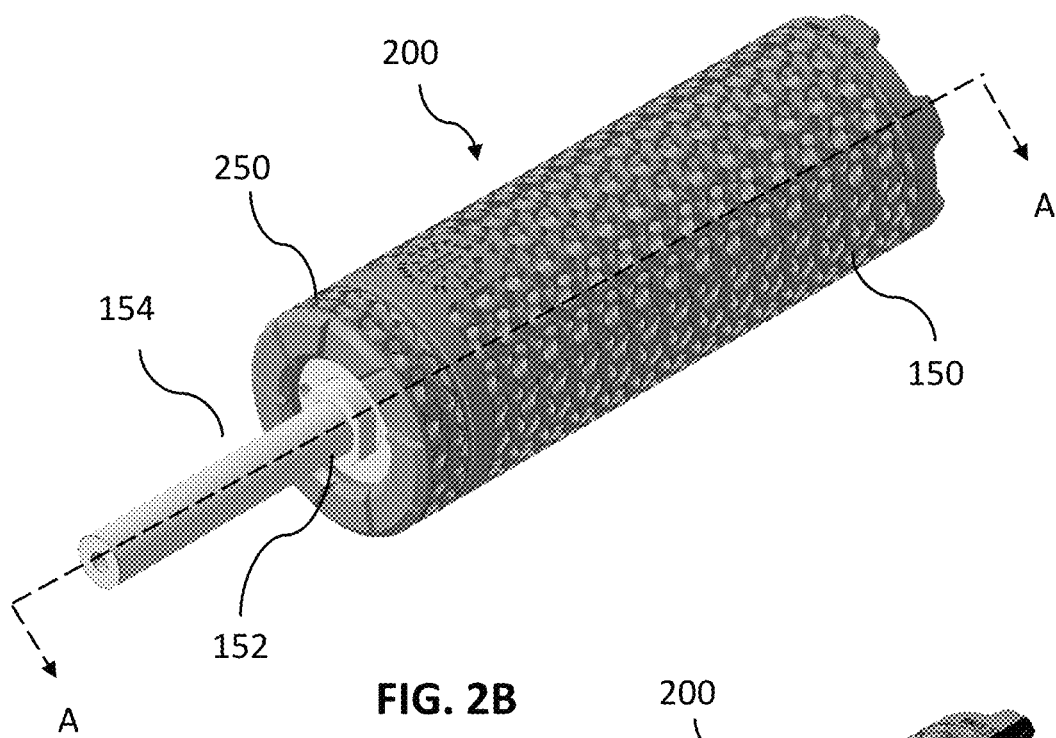
FIG. 2B is a close-up perspective view of a heat protective sleeve installed on the suppressor, in accordance with some embodiments.
Figure 2C:
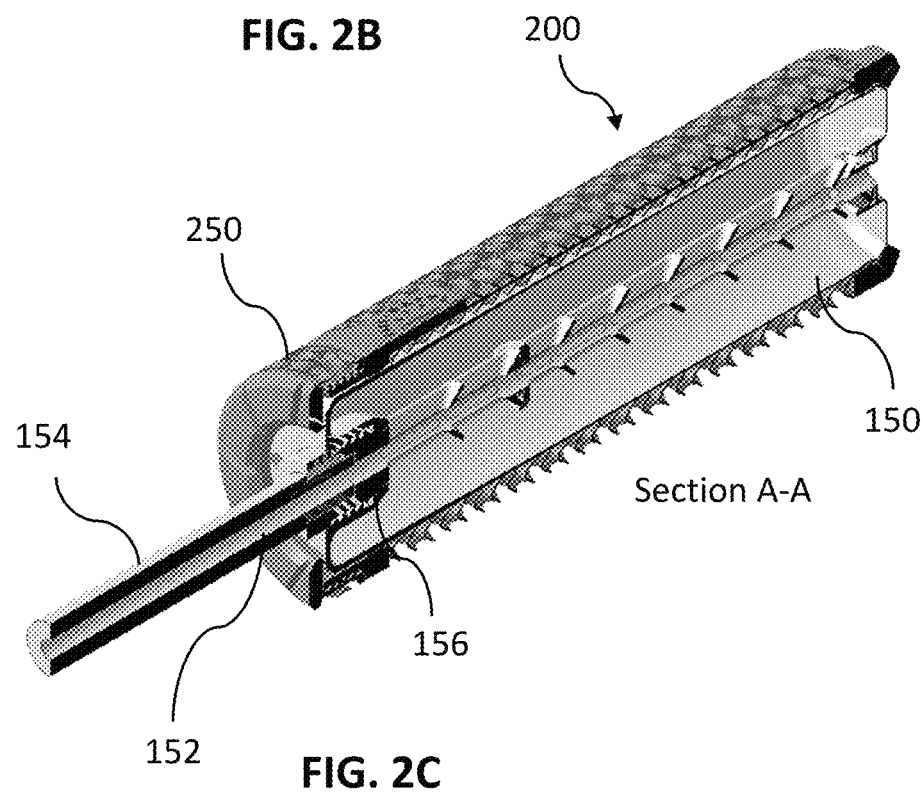
FIG. 2C is a cross-sectional view of a heat protective sleeve installed on the suppressor as shown in FIG. 2B, in accordance with some embodiments.

FIG. 2A is a perspective view of a heat protective sleeve 200 installed on the suppressor of a firearm, FIG. 2B is a close-up perspective view of a heat protective sleeve installed on the suppressor, and FIG. 2C is a cross-sectional view of a heat protective sleeve installed on the suppressor as shown in FIG. 2B, all in accordance with some embodiments. The heat protective sleeve 200 is mounted on the suppressor 150 so the suppressor 150 is located underneath the heat protective sleeve 200. This is shown in the cross-sectional view in FIG. 2C. The heat protective sleeve 200 is installed by, for example, sliding the heat protective sleeve 200 onto the suppressor 150 and then adjusting an endcap 250 to secure the heat protective sleeve 200 in place.

Figure 3A:
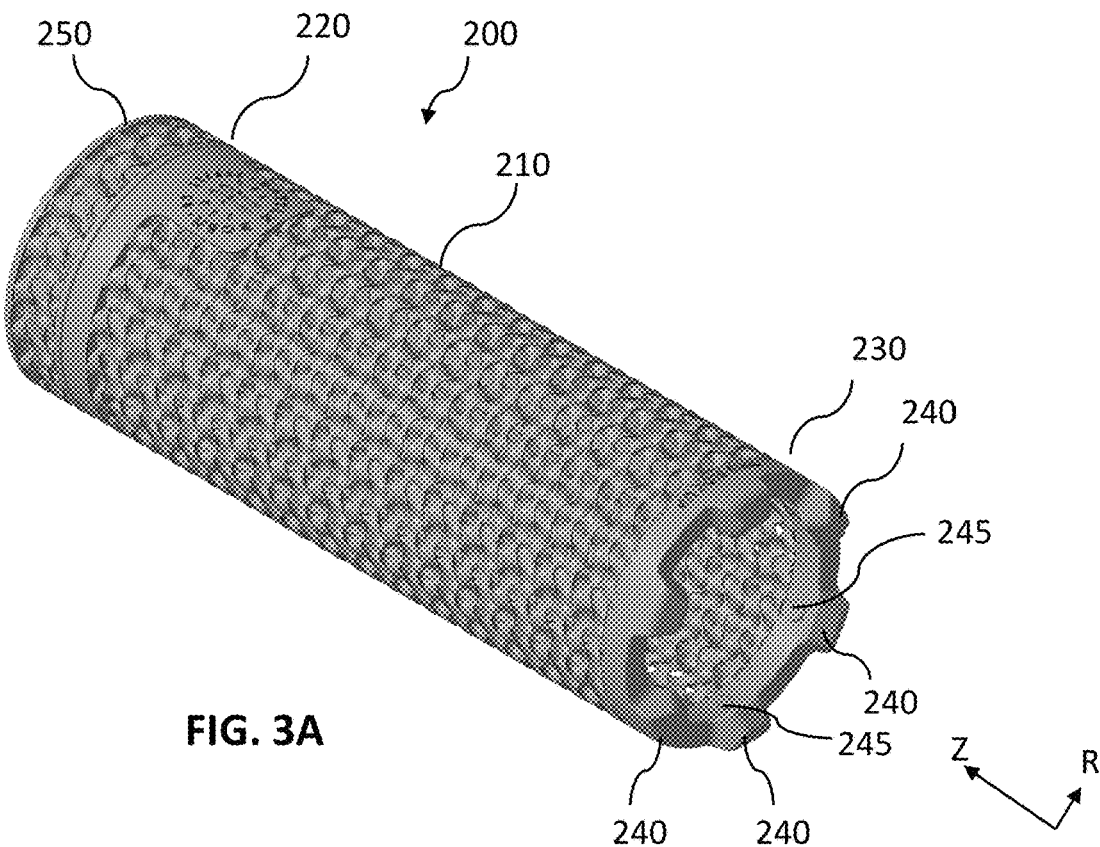
FIG. 3A is a perspective view of a heat protective sleeve, in accordance with some embodiments.
Figure 3B:
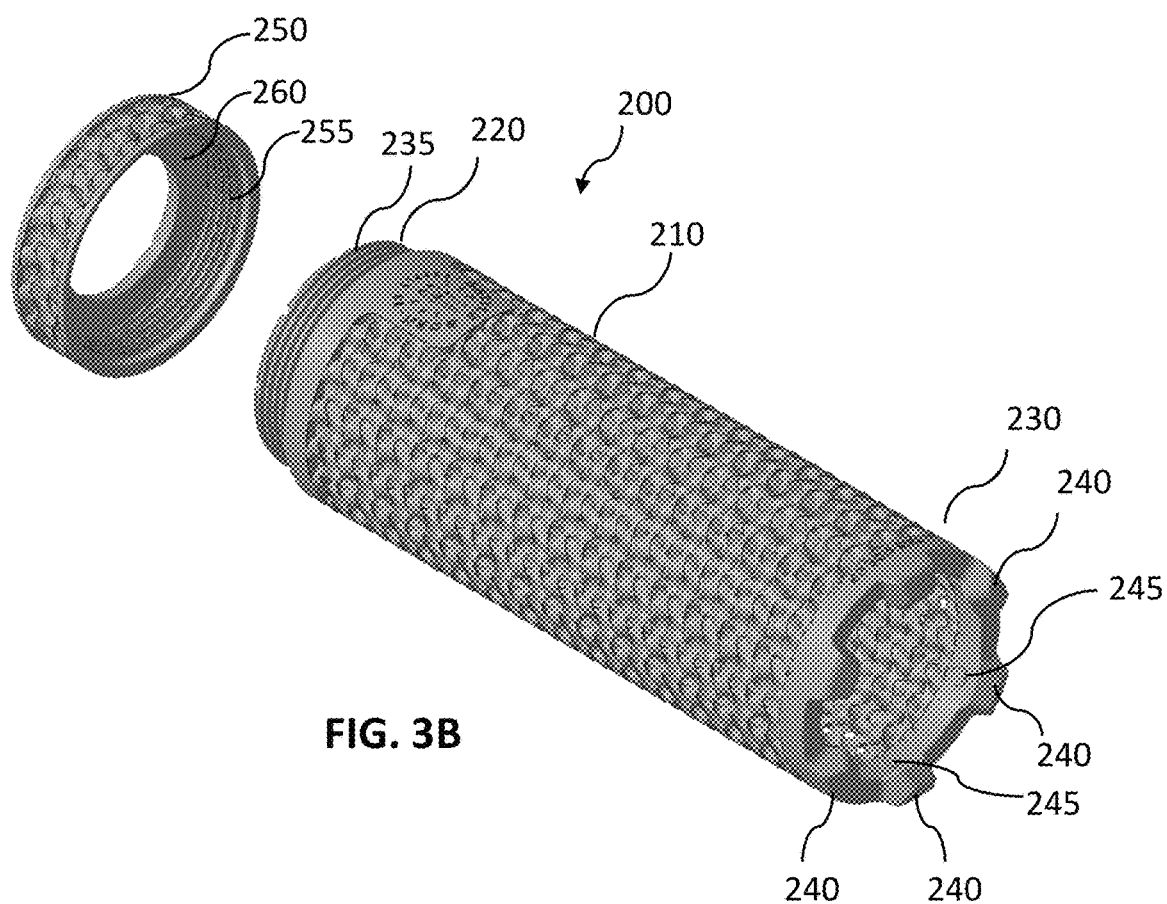
FIG. 3B is an exploded view of a heat protective sleeve, in accordance with some embodiments.
Figure 3C:
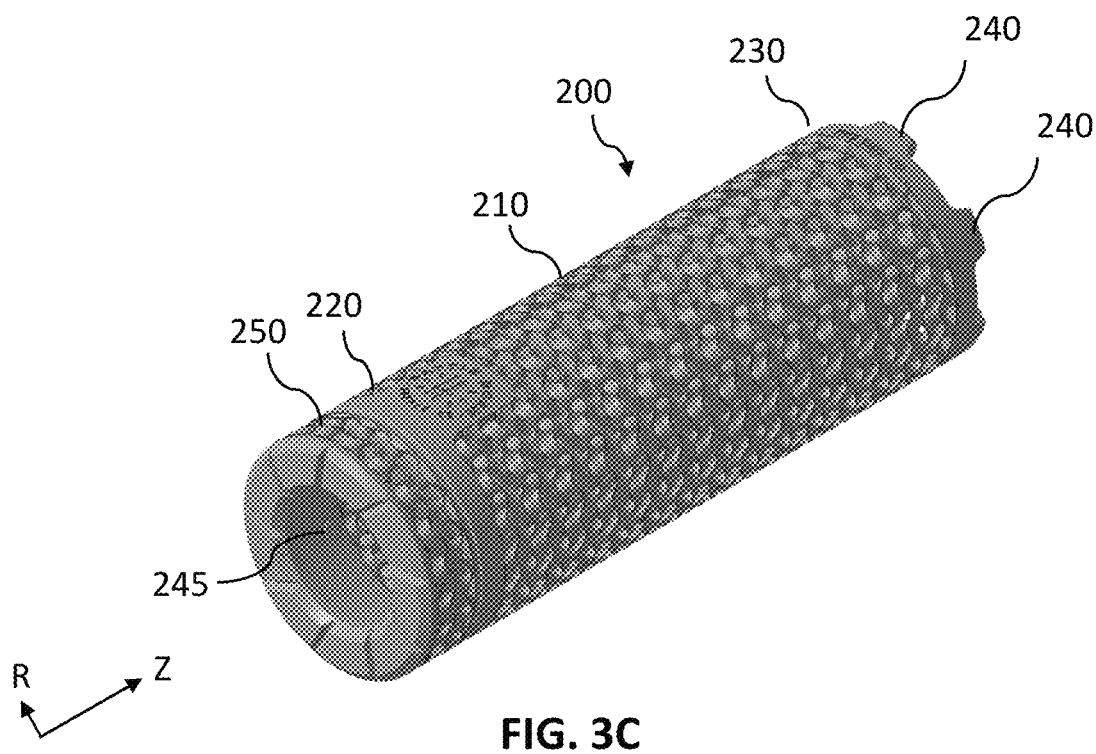
FIG. 3C is a perspective view of a heat protective sleeve, in accordance with some embodiments.
Figure 3D:
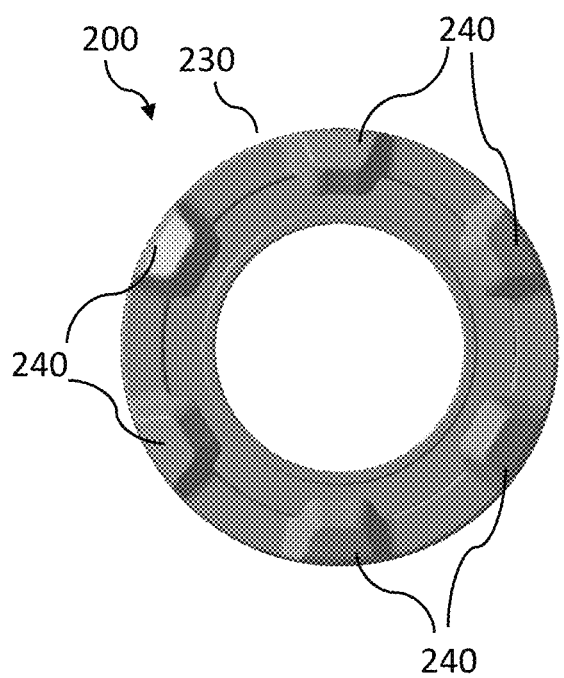
FIG. 3D is a front view of the heat protective sleeve as shown in FIG. 3A, in accordance with some embodiments.

FIG. 3A is a perspective view of the heat protective sleeve 200, FIG. 3B is an exploded view of the heat protective sleeve 200, and FIG. 3C is a perspective view of the heat protective sleeve 200, all in accordance with some embodiments. The heat protective sleeve 200 includes a body 210, and a first end 220 opposite a second end 230. The body 210 is cylindrical in shape, and extends in a longitudinal direction "Z" and also has a radial direction "R." The first end 220 has fastening threads 235, and the second end 230 has a plurality of tabs 240. FIG. 3D is a front view of the heat protective sleeve 200 as shown in FIG. 3A, in accordance with some embodiments. At the second end 230 of the body 210, the plurality of tabs 240 may be integral with the body 210 and be selected from a chamfer-type design, beveled edge design, or angled tab design. The plurality of tabs 240 are angled toward the inner diameter and create a reduced diameter at the end to serve as a stop. When the heat protective sleeve 200 is installed on the suppressor 150, the plurality of tabs 240 contact the first suppressor end of the suppressor 150—the underlying object—and prevent movement of the heat protective sleeve 200 or the suppressor 150 along the longitudinal direction Z ensuring a snug fit.

The body 210 has an inner diameter and an outer diameter. In some embodiments, the inner diameter of the body 210 includes a plurality of nubs 245 (FIGS. 3A-3C) configured to protrude toward the underlying object and contact the object rather than the main body 210 of the heat protective sleeve 200 having direct contact with the suppressor 150. The plurality of nubs 245 ensures minimal contact between the heat protective sleeve 200 and the suppressor 150 to avoid heat transfer between the components, and instead allows airflow between the components.

Figure 3E:
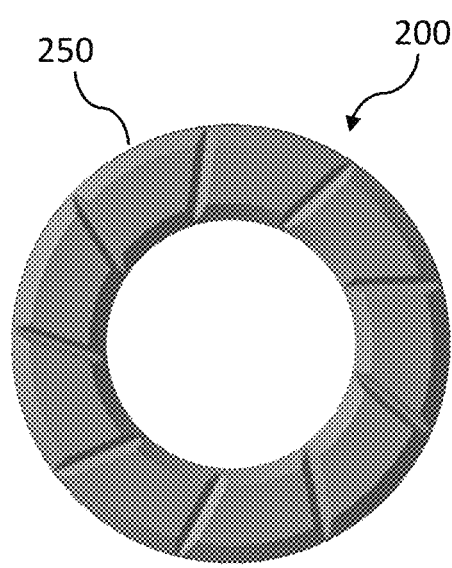
FIG. 3E is a rear view of the heat protective sleeve as shown in FIG. 3A showing the endcap, in accordance with some embodiments.

An endcap 250 removably couples to the body 210. The endcap 250 includes an outer diameter and an inner diameter of the endcap 250. The inner diameter of the endcap 250 includes mating threads 255 which engage with the fastening threads 235 of the body 210 to removably couple the endcap 250 to the body 210. In this embodiment, the mating threads 255 are internal threads and the fastening threads 235 are external threads, but it could be reversed in other embodiments. The endcap 250 also includes an outer surface and an inner surface 260. The inner surface 260 of the endcap 250 contacts the second suppressor end of the suppressor. FIG. 3E is a rear view of the heat protective sleeve 200 as shown in FIG. 3A showing the endcap 250, in accordance with some embodiments.

The heat protective sleeve 200 is a slip-on design to the firearm 100. For example, the firing end of the barrel 154 of the firearm 100 typically has a mount 156 (shown in FIG. 2C) which is threaded, nonthreaded or an adapter, that accepts the suppressor 150. To install the heat protective sleeve 200, the endcap 250 is removed from the body 210 and the first end 220 is slid over the mount 156 of the barrel 154. The suppressor 150 is then threaded onto the barrel 154 or attached to the mount 156. The fastening threads 235 of the body 210 of the heat protective sleeve 200 is slid over the suppressor 150 until the plurality of tabs 240 contact the first suppressor end of the suppressor 150 which is the firing end of the barrel 154. The plurality of tabs 240 act as a stop preventing the body 210 from further movement along the longitudinal direction Z.

The endcap 250 is threaded onto the body 210 of the heat protective sleeve 200 by the mating threads 255 of the endcap 250 engaging with the fastening threads 235 of the body 210. As the endcap 250 is tightened onto the body 210, the inner surface 260 of the endcap 250 contacts the second suppressor end of the suppressor 150 and applies a compressive force as the endcap 250 is threaded onto the body 210. This ensures a tight fit of the heat protective sleeve 200 to the suppressor 150.

In some embodiments, the heat protective sleeves 200 may use a fastener to removably couple the heat protective sleeve 200 about an object. The fastener may be selected from a screw, magnet, hook and loop, clamping device, thread, wire, strap, cord, cord clamps, ribbon, lace, or tie and be inserted in a cavity such as a hole, indentation, channel or slot in the wall of the first end 220 of the body 210. During the manufacturing of the heat protective sleeve 200, processes may be used to create cavities for threaded metal inserts with large flanges to provide support surface area as well as adhesion surface area. The inserts may be glued or pressed into the sleeve in order to avoid tapping the material for risk of breakage due to the inherent brittleness of the material. The gluing or pressing may be inserted from the inner diameter or inside surface of the body 210 and outwardly through the body 210 to the outer diameter or outer surface of the body 210. The fastener may be a system and include the fastener, the cavity, the inserts, and the like. Set screws may be inserted into the cavity such that the set screw contacts and presses against the body of the suppressor 150 holding the heat protective sleeve 200 in place. In some embodiments, the fastener is a flexible linear component such as a cord. For example, the cord may be threaded through cavities and pulled tight to prevent the heat protective sleeve 200 from slipping forward toward the muzzle end along the underlying object.

In some embodiments, the heat protective sleeves 200 of the present disclosure utilize triply periodic minimal surfaces (TPMS) structures to allow heat to vent and dissipate while insulating a user from the heated object being covered by the heat protective sleeve 200. A minimal surface is a geometry that locally minimizes the surface area for a given boundary. TPMS are periodic in three dimensions and are free of self-intersections. In this disclosure, the term TPMS shall be used to also mean infinite periodic minimal surfaces (IPMS). TPMS were first described by Hermann Schwarz in 1865, with additional TPMS described by Alan Schoen in 1970. TPMS/IPMS are described in terms of their fundamental region, which is the smallest portion of the surface used to construct the entire surface by periodically repeating the fundamental region in three dimensions. The fundamental region may also be referred to as a "unit cell" in this disclosure. These fundamental regions are bounded by mirror planes. FIG. 4A is a schematic of a gyroid triply periodic minimal surface, in accordance with some embodiments, and FIG. 4B is a schematic of a gyroid unit cell of the gyroid triply periodic minimal surface of FIG. 4A, in accordance with some embodiments. A gyroid surface 400 (e.g., gyroid triply periodic minimal surface) and a gyroid unit cell 410 of the gyroid surface 400 are illustrated. The gyroid unit cell 410 is shown as cubic and formed of walls with a wall thickness "Tw". The gyroid surface 400 can be approximated by:

$$\cos(x)\sin(y)+\cos(y)\sin(z)+\cos(z)\sin(x)=0$$

In another example, a Schwarz crossed layers of parallels (CLP) type of TPMS is described by the equations below, where $R(\tau)$ is the Weierstrass function and the Cartesian coordinates of the surface are the real parts (Re) of contour integrals, which are evaluated in the complex plane from a fixed point $\omega_0$ to a variable point $\omega$:

$$x=\text{Re}\int_{\omega_0}^{\omega}(1-\tau^2)R(\tau)d\tau$$

$$y=\text{Re}\int_{\omega_0}^{\omega}i(1-\tau^2)R(\tau)d\tau$$

$$z=\text{Re}\int_{\omega_0}^{\omega}2\tau R(\tau)d\tau$$

Other types of TPMS include Schoen's, Batwing, Neovius, Starfish, hybrids, and variations of each of these (e.g., Schoen's types include gyroid, CLP, I-6, H'-T, T'-R', S'-S" and others). Any of these TPMS structures, including types not listed herein, may be utilized in the present disclosure. FIG. 5A shows a Schoen's Gyroid TPMS, FIG.

5B shows a Schwarz CLP, and FIG. 5C shows a Schwarz Batwing, all as known in the art. Other types of TPMS structures are possible.

TPMS structures in the heat protective sleeve 200 create a strong component, as the entire body 210 of the heat protective sleeve 200 is one continuous, interconnected surface. High-temperature, non-metallic materials such as polymers, composites, and ceramics are generally fairly brittle, so having a structurally strong, tough component is important for the durability and functional lifespan of the heat protective sleeve 200. Parameters of the TPMS structure may be tuned such as the wall thickness and the number of cells per given dimension to modulate strength, weight, and thermal conductivity. In this disclosure, embodiments involve designs that uniquely tailor the parameters of TPMS structures to be suitable for the demanding conditions produced by firearm operation—such as dissipating high levels of heat—while also having beneficial performance in other aspects such as manufacturability and providing a user-acceptable weight and cost of the device. In some embodiments, the TPMS structures can be constructed using additive manufacturing techniques, which is also known as 3D printing.

Figure 6:
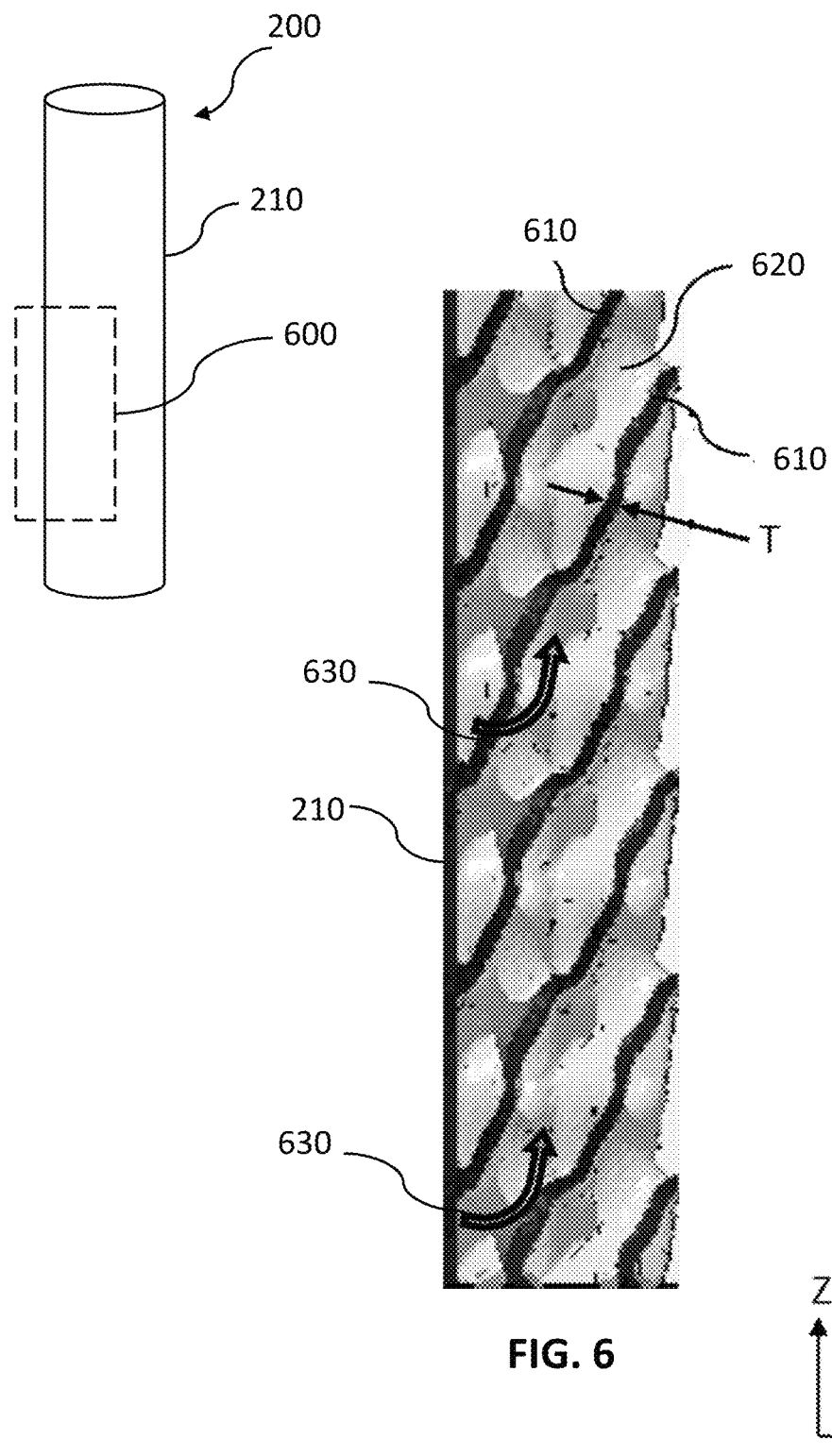
FIG. 6 is a close-up, longitudinal cutaway view of a portion of the body of the heat protective sleeve having a TPMS structure, in accordance with some embodiments.

The TPMS structures have a plurality of unit cells arranged circumferentially around the body 210 of the heat protective sleeve 200. The unit cells repeat in the longitudinal (Z) and radial (R) directions, where parameters of the unit cells may vary in the longitudinal and/or radial directions. FIG. 6 is a close-up, longitudinal cutaway view 600 of a portion of the body 210 of the heat protective sleeve 200 having a TPMS structure, in accordance with some embodiments. The TPMS structure is formed of walls 610 with wall thickness "T", where open spaces between the walls 610 form channels 620 within the TPMS structure. As can be seen by the repeating nature of the TPMS, the TPMS structure is periodic in the longitudinal direction and radial direction in this embodiment. Heat from the underlying object can enter channels 620. The channels 620 are continuously connected to each other due to the non-intersecting nature of the TPMS. The channels 620 provide flow pathways for heat to travel radially outward and along the length of the body 210 as shown by the arrows 630. The heat dissipates through convection as it traverses longitudinally along the body 210 and outward toward ambient air while also encountering air in the negative spaces of the TPMS structure.

The surface thickness or wall thickness T of the TPMS structure may be designed to meet specifications. The wall thickness T may be chosen for strength considerations for handling the heat protective sleeve 200 since the materials used are generally brittle. The wall thicknesses T in the present disclosure may have lower bounds governed by the physical properties (e.g., tensile strength, impact strength) of the material that the walls are made of and by the resolution and minimum wall thickness capabilities of the production method (e.g., particular type of 3D printing) being used to manufacture the device. Example of wall thicknesses T of the TPMS structure may be, for example, less than or equal to 5.0 mm, or less than or equal to 2.0 mm, or 0.1 mm to 3.0 mm, or 0.25 mm and 5 mm, or 0.5 mm to 3.0 mm, or about 1.5 mm, or 0.5 to 1 mm. The wall thicknesses T of the TPMS structure depends on external specifications such as weight limitations, durability, maximum operating temperatures, or the like.

In some embodiments, the TPMS wall thickness T of each unit cell may be constant throughout the TPMS structure. In other embodiments, thickness may vary within the body 210 of the heat protective sleeve 200, such as in the longitudinal direction. For example, wall thickness T may decrease in the longitudinal direction Z, from first thickness which is closer to the first end 220 of the heat protective sleeve 200, to a second thickness which is closer to the second end 230. In other words, the wall thickness T of walls in the TPMS structure may vary in a longitudinal direction. In other embodiments, the wall thickness of walls in the TPMS structure may vary in a radial direction.

In some embodiments, the unit cell size of the TPMS structure is configured to modulate strength, weight, and thermal conductivity of the heat protective sleeve 200. The unit cell size is controlled by length, width, and height and each of these may be constant or may vary in the longitudinal direction Z and/or circumferential direction R. In some embodiments, the unit cell size of the TPMS structure is constant throughout the TPMS structure. In some embodiments, the unit cell size of the TPMS structure varies in a longitudinal direction. In other embodiments, the unit cell size of the TPMS structure varies in a radial direction. For example, the unit cell size of the TPMS structure may decrease between the first end 220 and the second end 230 of the body 210. In some embodiments, the height of the unit cells decreases from the first end 220 toward the second end 230 while the widths are approximately the same. In other embodiments, the width of the unit cell may change instead of or in addition to the height. Additionally, the unit cell size can vary in one or more portions of the body 210 of the heat protective sleeve 200, or along the entire heat protective sleeve 200. For example, when the underlying object is a suppressor 150, the suppressor 150 may generate more heat at one end than the other end. Accordingly, the unit cell sizes may be decreased in a longitudinal direction from larger heat-flow channels with more negative space near the first end 220 of the heat protective sleeve 200 to smaller heat-flow channels with less negative space near the second end 230.

The height of the unit cells produces a corresponding thickness of the TPMS structure or a thickness of the body 210 of the heat protective sleeve 200, itself. The thickness is defined as the distance between the inner diameter of the body 210 and the outer diameter of the body 210. This is illustrated as $T_P$ in FIG. 9D. The thickness or wall thickness $T_P$ of the sleeve/body may be constant throughout or may vary in the longitudinal direction Z and/or circumferential direction R. The thickness $T_P$ relates to the strength, the weight, and the thermal conductivity of the heat protective sleeve 200. As the thickness $T_P$ decreases, the strength of the heat protective sleeve 200 may decrease. As the thickness $T_P$ increases, the heat protective sleeve 200 may act as a better bulk conductor of heat instead of an insulator and have more weight. These factors need to be controlled and balanced for optimal performance of the heat protective sleeve 200. In some embodiments, the thickness of the sleeve/body, thickness $T_P$, may be 3.2 mm to 6.4 mm, or 5.0 to 12.7 mm or about 6.4 mm.

In some embodiments, the heat protective sleeve 200 having TPMS structures in accordance with the present disclosure are fabricated using additive manufacturing, which is also known as three-dimensional (3D) printing. Various materials are possible for the present heat protective sleeve 200, such as polymers and ceramics. Examples of 3D printing processes that are possible for manufacturing the present heat protective sleeve 200 include powder bed fusion (PBF), binder jetting, fused filament fabrication (FFF), Digital Light Processing (DLP), Multi-Jet Fusion (MJF), and selective laser melting (SLM), or the like. 3D printing typically has a build platform where material layers are built upon each other, with each layer being formed according to the desired TPMS structure geometry. The entire heat protective sleeve 200 may be built as one piece. In some embodiments, partial portions of the heat protective sleeve 200 can be built and then assembled together. For instance, if a 3D printer is limited in the size of a part that can be produced, two or more lengthwise portions of the body 210 can be built individually and then joined together by bonding methods.

Materials may be chosen based on tensile strength, toughness, impact strength, thermal conductivity, heat deflection temperature (HDT), and working temperature. High-temperature polymers may be used such as polyamides, cyanate esters, epoxies, acrylates, or other high-temperature polymers. Example ceramics include silicon carbide (SiC), zirconia ($ZrO_2$), alumina, porcelain, aluminum titanate, silicate, or other ceramic materials. Protective coatings may be selected from Physical Vapor Deposition (PVD) coatings, ceramic-based coatings (i.e., Cerakote® and Jet-Hot®), powder coatings, or others. The protective coating should adhere to the high-temperature polymer and have a higher rated operating temperature than the underlaying high-temperature polymer. For example, some high-temperature polymers are rated with a heat deflection temperature of 750° F. while some protective coatings are rated above 2200° F.

Another type of geometric structure is an open cell foam structure. In some embodiments, the heat protective sleeves 200 of the present disclosure utilize open cell foam structures to allow heat to vent and dissipate while insulating a user from the heated object being covered by the heat protective sleeve 200. FIG. 7 is a schematic of an open cell foam structure 700, in accordance with some embodiments. The open cell foam structure 700 as illustrated may be comprised of zirconia ($ZrO_2$) ceramic foam with a random matrix stochastic configuration. This may be produced by methods such as foaming of liquid or solid (powder) ceramics, vapor deposition (physical (PVD) or chemical (CVD) on a random matrix), direct or indirect random casting of a mold containing beads or matrix, or 3D printing/additive manufacturing. The zirconia ($ZrO_2$) ceramic foam may have a relative density of about 15% and 30-100 pores per inch (PPI), and a low thermal conductivity of ~3 W/m·K for limiting heat transfer from the underlying object to heat protective sleeve 200 and outward to the user. The PPI and relative density may be modulated and the foam produced out of different materials and through different processes. For example, the material zirconia may be used in foaming production methods, while high-temperature polymers (filled or non-filled with ceramic or composite particles) may be used in 3D printing of open cell structures such as Voronoi cell structures.

In some embodiments, a ligament thickness and a cell size of the open cell foam structure may be constant or vary along the longitudinal direction of the heat protective sleeve 200. For example, as described herein for open cell structures, the ligament thickness $T_L$ (shown in FIG. 7) and cell size $Cs_1$ of the open cell foam structure is configured to modulate strength, weight, and thermal conductivity of the heat protective sleeve 200. The ligament thickness $T_L$ in foam and truss versions (truss version described herein regarding lattice structures) is the diameter of the individual cell ligaments or truss elements. In some embodiments, the cross-section is not circular but another shape. In those cases, the ligament thickness $T_L$ is the appropriate dimension for the thickness.

Another type of geometric structure is a lattice structure. In some embodiments, the heat protective sleeves 200 of the present disclosure use a lattice structure to allow heat to vent and dissipate while insulating a user from the heated object being covered by the heat protective sleeve 200. FIG. 8A is a schematic of a lattice structure, in accordance with some embodiments, and FIG. 8B is a schematic of an octet-truss lattice unit cell of the lattice structure, in accordance with some embodiments. The octet-truss lattice surface 800 and the octet-truss lattice unit cell 810 which is cubic, are illustrated. The octet-truss lattice surface 800, or other lattice structures, such as Bravais or strut lattices (for example, simple cubic, body-centered, body-centered cubic, face-centered cubic, Kelvin cell, hexagonal closest packed) and planar lattices, may be comprised of a high-temperature polymer.

In some embodiments, a beam thickness $T_B$ and a cell size $Cs_2$ of the lattice structure may be constant or vary along the longitudinal direction of the heat protective sleeve 200. For example, as described herein for lattice structures, the beam thickness $T_B$ (shown in FIG. 8B) and cell size $Cs_2$ of the lattice structure is configured to modulate strength, weight, and thermal conductivity of the heat protective sleeve 200.

Figure 9A:
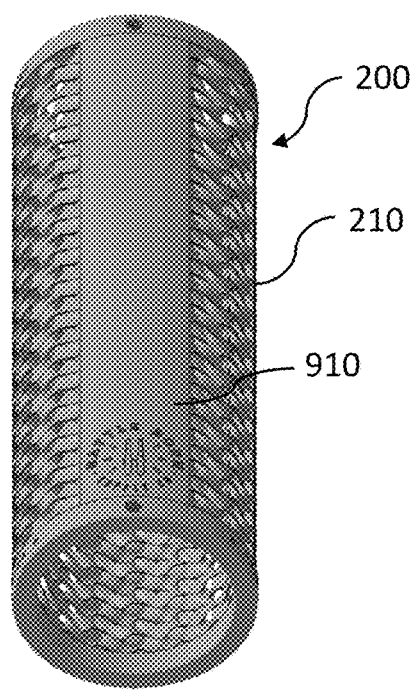
FIGS. 9A-9C show a strip of the heat protective sleeve, all in accordance with some embodiments.
Figure 9B:
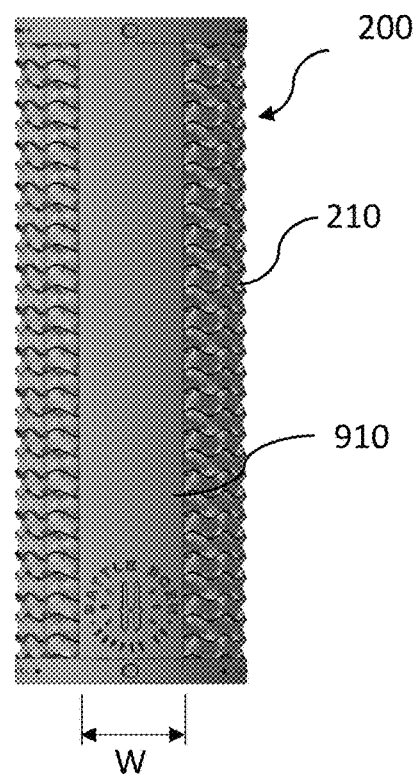
Figure 9C:
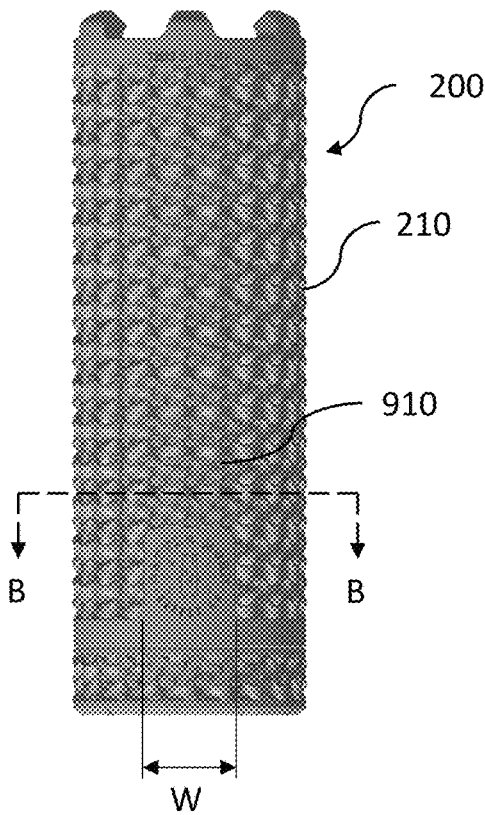
Figure 9D:
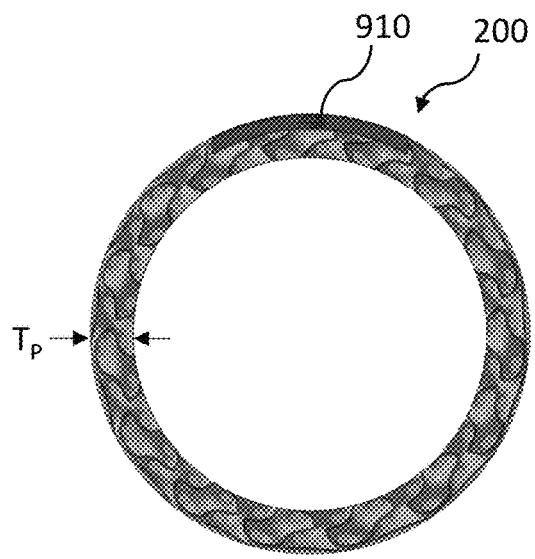
FIG. 9D is a cross-sectional view of a heat protective sleeve as shown in FIG. 9C, in accordance with some embodiments.

FIGS. 9A-9C show the strip of the heat protective sleeve, all in accordance with some embodiments. FIG. 9A is a perspective view of the heat protective sleeve 200, and FIGS. 9B and 9C are top views of two embodiments of the heat protective sleeve 200. FIG. 9D is a cross-sectional view of a heat protective sleeve 200 as shown in FIG. 9C, in accordance with some embodiments. FIGS. 9A-9D show the body 210 comprised of a TPMS structure where the TPMS structure comprises a gyroid geometry as an example. Other geometric structures such as open cell foam structures and lattice structures, as described herein, may be used. The body 210 of the heat protective sleeve 200 may include a strip 910. The strip 910 is located along the surface of the body 210, or integral within the thickness of the body 210. The body 210 has an inner diameter and an outer diameter, and the strip 910 is located on the inner diameter, the outer diameter, or between the inner diameter and the outer diameter. The thickness or wall thickness $T_P$ of the body 210 is the difference between the outer diameter of the body 210 and the inner diameter of the body 210.

FIGS. 9A and 9B illustrates the strip 910 on the outer diameter of the body 210 and FIG. 9C illustrates the strip 910 between the inner diameter and the outer diameter of the body 210 with the TPMS structure on the outer diameter of the body 210 hence over the strip 910. The strip 910 extends along the longitudinal direction Z of the body 210. The strip 910 is a solid, continuous form of the material. Put another way, the strip 910 is solid and without holes through it or without negative spaces in the material. The strip 910 may be a same material as the TPMS structure or may be a different material from the TPMS structure in other embodiments. The strip 910 may be formed during the 3D printing process by programming the parameters into the layers.

The heat protective sleeve 200 is oriented on the underlying object such as the suppressor 150 of the barrel 154 of the firearm 100, with the strip 910 extending outward and upward on the top surface of the suppressor 150. For example, the strip 910 is positioned on the top side of the barrel 154 of the firearm 100 and suppressor 150 along the line of sight and below the sight picture and field of view of the optical device. The location of the strip 910 blocks or diminishes the optical refraction phenomenon known as heat haze or miraging when sighting a target. The strip 910 is effective in mitigating the heat haze when using the front and rear sights of the firearm 100 as well as when using attached optics on the firearm 100.

The size of the strip 910 can be customized. The strip has a width such as when lying flat, and when the strip is placed on a circular object, the width becomes a length around a circumference or perimeter and may be referred to as an arc length. This is shown in FIGS. 9B and 9C as label W. Through investigations performed in relation to the present disclosure, a unique insight was gained that the minimum arc length of the strip 910 to adequately mitigate the miraging effect was found to be dependent on the average radius of the underlying object. In embodiments, the strip 910 has an arc length along the object, and the arc length (e.g., width of the strip 910) is based on an average radius of the object. It was discovered that when the underlying object has an average radius less than or equal to 12.7 mm, the width of the strip 910 (or arc length of the strip 910) should be two times the average radius of the object for effective mitigation of the miraging effect. For example, if the underlying object has a radius of 12.7 mm, the circumference (circumference=2×radius×pi) of the underlying object is 79.8 mm, and the strip 910 should have a width of 25.4 mm (or effective arc length when wrapped around the underlying object).

Similarly, when the object has the average radius ranging from greater than 12.7 mm to less than 38.1 mm, the width of the strip 910 should be 1.5 to 2 times the average radius of the object for effective mitigation of the miraging effect. Lastly, when the average radius ranges from greater than or equal to 38.1 mm, the width of the strip 910 should be 1.0 to 1.5 times the average radius of the object for effective mitigation of the miraging effect. Thus, it was unexpectedly found that the greater the diameter of the underlying object, the smaller the width of the strip 910 that was needed relative to the diameter of the underlying object to effectively reduce the heat haze or miraging effect on attached optical devices. Optimizing the width of the strip 910 in this manner beneficially prevents heat miraging effects while still insulating the user from the heated underlying object and ensuring that the weight of the heat protective sleeve 200 is optimized. Creating a wider solid strip 910 would add unwanted weight to device, limiting its favorability with users, or trap heat that could possibly, over time, damage the underlying object.

The thickness of the strip 910 is dependent on external variables such as weight limitations, durability, maximum operating temperatures or the like. In some embodiments, the thickness of the strip 910 is in the range of 0.25 mm to 5.2 mm.

The heat protective sleeve 200 is customizable to accommodate a variety of suppressors 150. For example, the heat protective sleeve 200 can accommodate suppressors having an outer diameter of 12 mm to 130 mm. In another example, for the heat protective sleeve 200, the length of the body 210 in the longitudinal direction Z or the length of the endcap 250 may be varied to accommodate the length of the suppressor 150 (i.e., underlying object) to ensure a proper fit of the heat protective sleeve 200. The heat protective sleeve 200 can accommodate suppressors with a length between 12 mm to 760 mm.

Referring to FIGS. 9A-9D, the body 210 of the heat protective sleeve 200 is shown with a TPMS structure but the other geometric structures such as the open cell foam structure and the lattice structure, as described herein, may be used. The geometric structure—the TPMS structure—has a minimal volume aspect due to the negative spaces within the structure, and a maximum surface area aspect. This is counterintuitive because more radiant heat would be transferred with greater surface area. However, the geometric structure is comprised of a material such as polymers or ceramics which have low thermal conductivity acting as insulators and preventing heat transfer. Further, the geometric structure has a minimal volume—negative spaces comprised of air—which does not conductively transfer heat well. Due to the plurality of nubs 245, the heat protective sleeve 200 has a small amount of contact area with the underlying hot object so minimal thermal conduction is generated. In testing, the heat protective sleeve 200 was installed on a testing rig (e.g., the underlying object) and heated to 450° F. The user could comfortably hold the heat protective sleeve 200 for several minutes without burns to the hand.

The heat protective sleeve 200 can be used for infrared (IR) or thermal signature obfuscation. As a weapon is fired or exhaust flows through an exhaust pipe, the object heats up, and as it does so, the IR signature becomes more pronounced. In hostile environments, the firearm 100 and suppressor 150 are heat sinks, and infrared light casts off the suppressor 150 due to the thermal signature, making the firearm 100, suppressor 150, and thus user, visible to enemies. Conventional suppressor covers are a solid, continuous material construction, which insulates the suppressor 150 and barrel 154, locking in heat and preventing venting or cooling. This may cause damage to the firearm 100 or suppressor 150 or reduce the lifetime of the firearm 100 or suppressor 150. In contrast, the heat protective sleeve 200 in the present embodiments with the geometric structure on the body 210 obscures or camouflages some of the infrared light generated by the hot suppressor 150 or firearm barrel 154 while allowing the suppressor 150 or barrel 154 of the firearm 100 to naturally cool. Using the heat protective sleeve 200 provides protection to the firearm 100 or suppressor 150 by allowing it to cool naturally, protection to the user so the user can grasp and manipulate the firearm 100 or suppressor 150 without sustaining burns, and obfuscation of the infrared/thermal signature. The heat protective sleeve 200 acts as thermal camouflage which can be beneficial in covert operations.

The heat protective sleeve 200 is comprised of high-temperature tolerant materials, such as polymers and ceramics and in some embodiments, protective coatings, which may be inherently brittle. Due to the brittleness of the material, the heat protective sleeve 200 may chip and crack easily so securing the heat protective sleeve 200 to the underlying object is challenging. The heat protective sleeve 200 is designed to slip-on and over the suppressor 150. The heat protective sleeve 200 may be easily, quickly, and firmly installed or removed from the underlying object such as a suppressor 150. The strip 910 is positioned on the top side of the barrel 154, and the heat protective sleeve 200 fully wraps or covers the suppressor 150. The plurality of nubs 245 of the heat protective sleeve 200 may contact and grip the suppressor 150 enabling the strip 910 to be held in place on the top surface of the barrel 154 without slipping. This improves shooter and weapon accuracy by effectively eliminating heat haze. The endcap 250 and the plurality of nubs 245 also secure the body 210 and the strip 910. The heat protective sleeve 200 may be removed by unscrewing the endcap 250, then grasping the body 210 of the heat protective sleeve 200 and pulling it away from the object. In some embodiments, the heat protective sleeve 200 may naturally slide off the object after the endcap 250 is disengaged or loosened from the secured position.

The heat protective sleeve 200 in the present embodiments is designed to allow heat to vent and dissipate naturally by providing open spaces while insulating a user from the heated underlying object. The parameters of materials, geometric structures, and the size of the strip 910 may be customized depending on the application. For example, the parameters can be tuned to produce the heat protective sleeve 200 specifically for strength and durability, thermal protection, or obfuscation/camouflage of the thermal or IR signature. This may involve the use of a particular material, varying the thickness or unit cell size of the geometric structure for strength and durability, adjusting the size of the negative spaces in the geometric structure for venting and weight considerations, and/or decreasing or eliminating the strip 910.

Reference has been made to embodiments of the disclosed invention. Each example has been provided by way of explanation of the present technology, not as a limitation of the present technology. In fact, while the specification has been described in detail with respect to specific embodiments of the invention, it will be appreciated that those skilled in the art, upon attaining an understanding of the foregoing, may readily conceive of alterations to, variations of, and equivalents to these embodiments. For instance, features illustrated or described as part of one embodiment may be used with another embodiment to yield a still further embodiment. Thus, it is intended that the present subject matter covers all such modifications and variations within the scope of the appended claims and their equivalents. These and other modifications and variations to the present invention may be practiced by those of ordinary skill in the art, without departing from the scope of the present invention, which is more particularly set forth in the appended claims. Furthermore, those of ordinary skill in the art will appreciate that the foregoing description is by way of example only and is not intended to limit the invention.

What is claimed is:

1. A heat protective sleeve for a firearm comprising:
   a body being a cylindrical sleeve extending along a longitudinal direction, and comprising a triply periodic minimal surfaces (TPMS) structure having open spaces in communication with ambient air at an outer surface of the body;
   a strip extending along the longitudinal direction on a portion of the body, the strip being a same material as the TPMS structure, and the material of the strip being solid and without holes through it; and
   an endcap that removably couples to the body.

2. The heat protective sleeve of claim 1, wherein the TPMS structure comprises a gyroid geometry.

3. The heat protective sleeve of claim 1, wherein the TPMS structure comprises a polymer including polyamide, cyanate ester, epoxy, or acrylate.

4. The heat protective sleeve of claim 1, wherein a wall thickness and a unit cell size of the TPMS structure are constant throughout the TPMS structure.

5. The heat protective sleeve of claim 1, wherein the strip has an arc length along an underlying object, and the arc length is based on an average radius of the object.

6. The heat protective sleeve of claim 5, wherein:
   the object has the average radius less than or equal to 12.7 mm, and the arc length of the strip is two times the average radius of the object;
   the object has the average radius ranging from greater than 12.7 mm to less than 38.1 mm, and the arc length of the strip is 1.5 to 2 times the average radius of the object; and
   the average radius ranges from greater than or equal to 38.1 mm, and the arc length of the strip is 1.0 to 1.5 times the average radius of the object.

7. The heat protective sleeve of claim 1, wherein the body further comprises a first end opposite a second end, the second end having a plurality of tabs selected from a chamfer-type design, beveled edge design, or angled tab design.

8. The heat protective sleeve of claim 7, wherein:
   the first end of the body further comprises fastening threads;
   the endcap further comprises mating threads; and
   the mating threads of the endcap engages with the fastening threads of the body to removably couple the endcap to the body.

9. The heat protective sleeve of claim 1, wherein the body further comprises an inner diameter and an outer diameter, and the strip is located on the inner diameter, the outer diameter, or between the inner diameter and the outer diameter.

10. The heat protective sleeve of claim 9, wherein the inner diameter of the body further comprises a plurality of nubs configured to protrude toward an underlying object and contact the object.

11. A heat protective sleeve for a firearm comprising:
    a body being a cylindrical sleeve extending along a longitudinal direction having open spaces in communication with ambient air at an outer surface of the body, the body having a first end opposite a second end, the first end having fastening threads, and the second end having a plurality of tabs;
    a strip extending along the longitudinal direction on a portion of the body, the strip being a same material as the body, and the material of the strip being solid and without holes through it; and
    an endcap having mating threads configured to engage with the fastening threads of the body to releasably couple the endcap to the body.

12. The heat protective sleeve of claim 11, wherein the body comprises a triply periodic minimal surfaces (TPMS) structure, wherein a wall thickness and a unit cell size of the TPMS structure are constant along the longitudinal direction of the body.

13. The heat protective sleeve of claim 12, wherein the TPMS structure comprises a gyroid geometry.

14. The heat protective sleeve of claim 12, wherein the TPMS structure comprises a polymer including polyamide, cyanate ester, epoxy, or acrylate.

15. The heat protective sleeve of claim 11, wherein the body comprises an open cell foam structure, wherein a beam thickness and a cell size of the open cell foam structure are constant along the longitudinal direction of the body.

16. The heat protective sleeve of claim 15, wherein the open cell foam structure is comprised of zirconia ($ZrO_2$) ceramic foam.

17. The heat protective sleeve of claim 11, wherein the body comprises a lattice structure, wherein a beam thickness and a unit cell size of the lattice structure are constant along the longitudinal direction of the heat protective sleeve.

18. The heat protective sleeve of claim 17, wherein the lattice structure is comprised of an octet-truss lattice.

19. The heat protective sleeve of claim 11, wherein the strip has an arc length along an underlying object, and the arc length is based on an average radius of the object.

20. The heat protective sleeve of claim 11, wherein the plurality of tabs is selected from a chamfer-type design, beveled edge design, or angled tab design.

\* \* \* \* \*